May 16, 1944.　　　A. R. PERKINS　　　2,349,196
POWER PLANT ASSEMBLY
Filed July 23, 1941　　　4 Sheets-Sheet 2
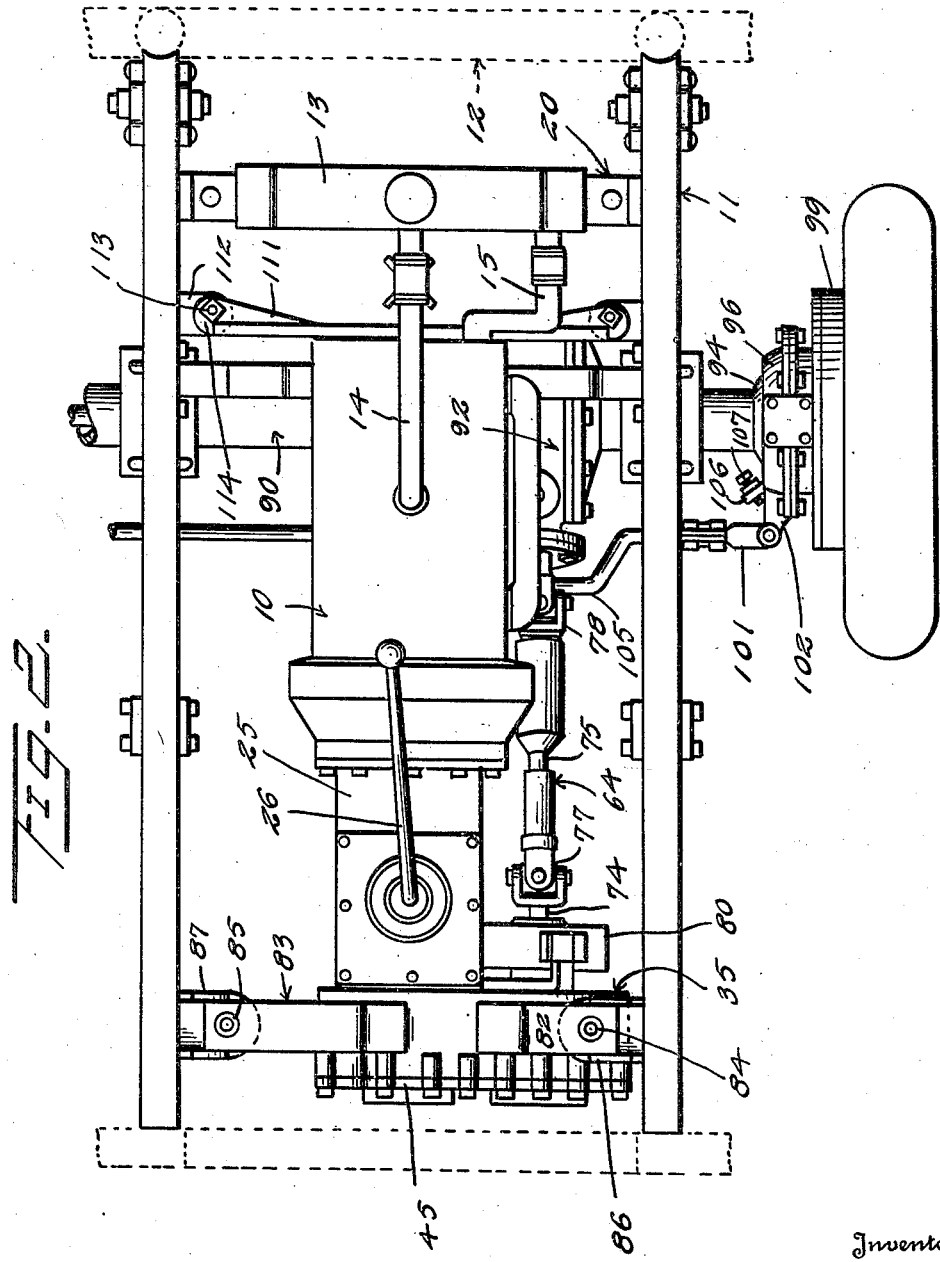
Inventor
A. R. Perkins
By Kimmel & Crowell
Attorneys

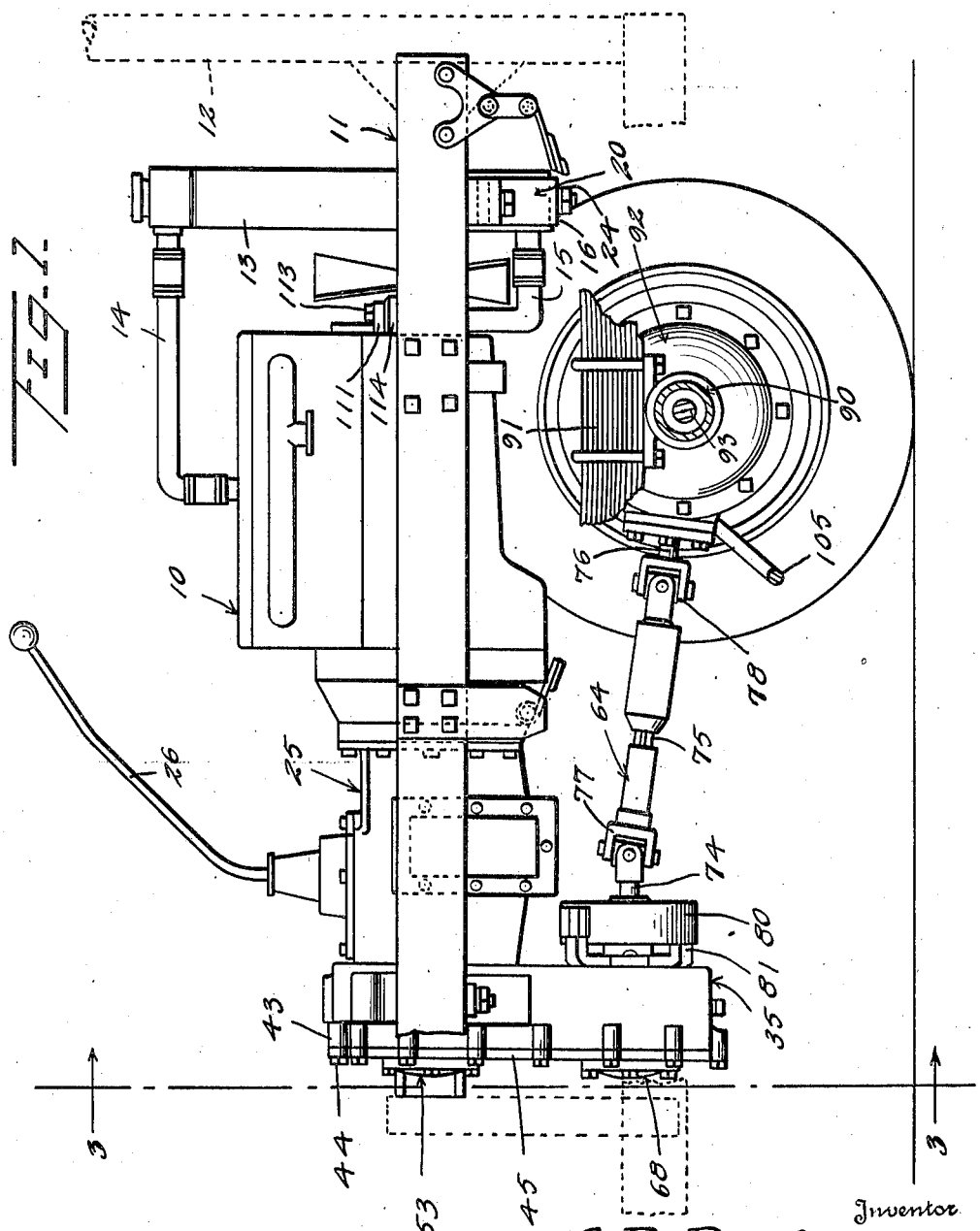

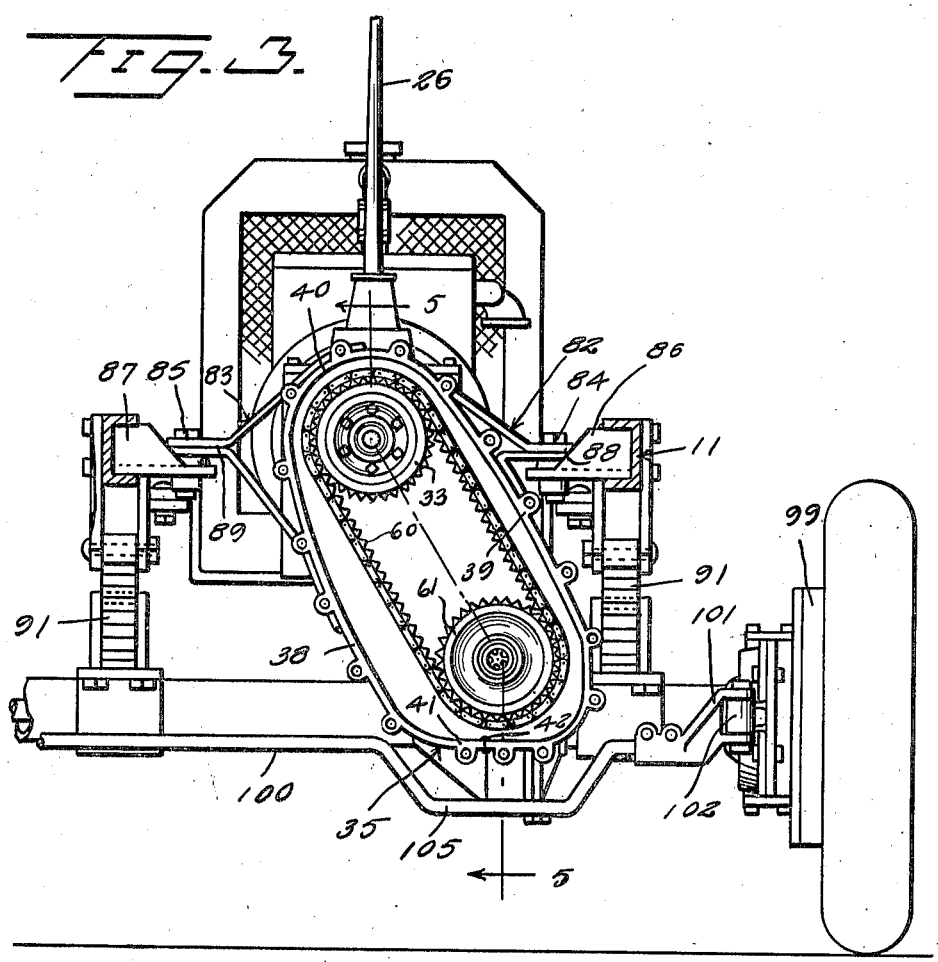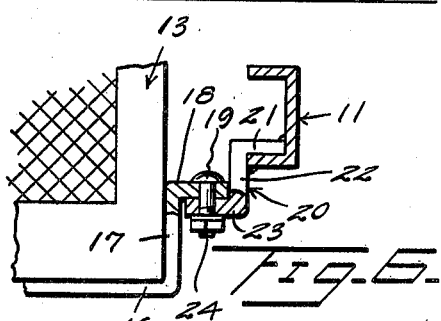

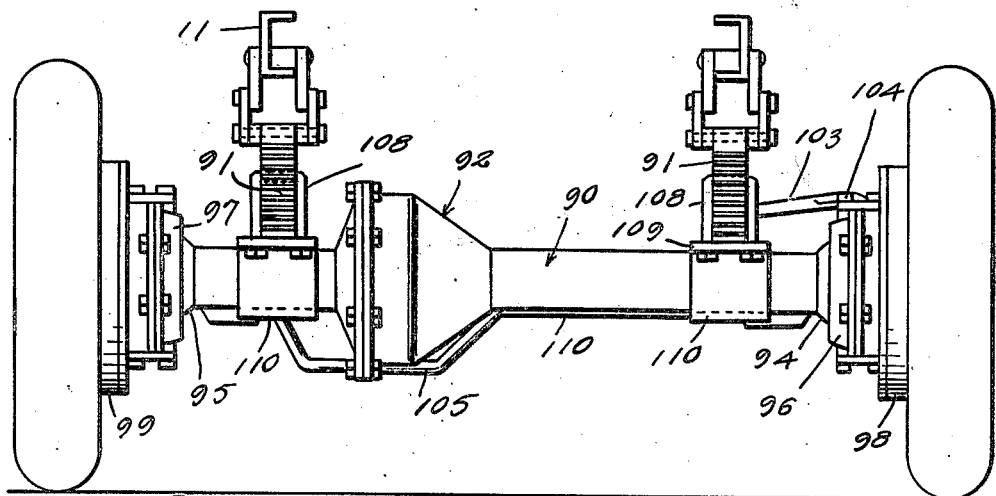
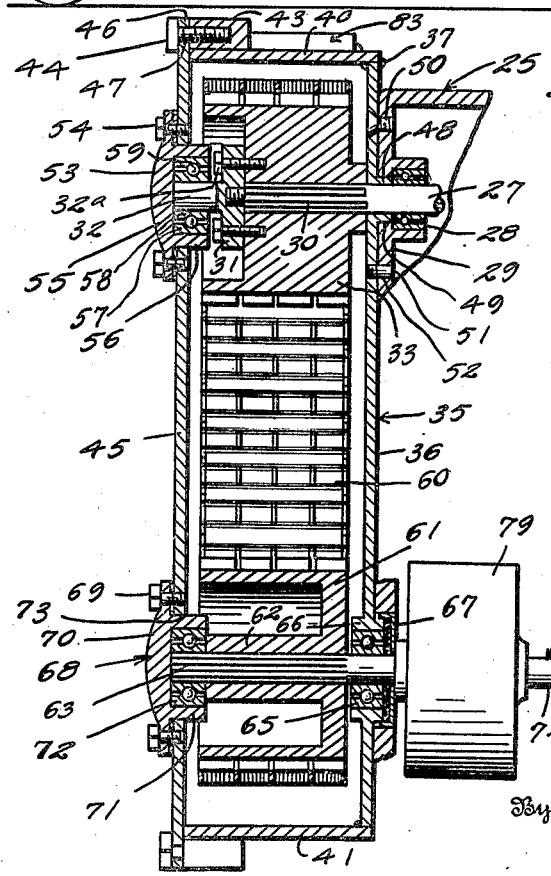

Patented May 16, 1944

2,349,196

UNITED STATES PATENT OFFICE 2,349,196

POWER PLANT ASSEMBLY

Arthur R. Perkins, Oneonta, N. Y.

Application July 23, 1941, Serial No. 403,733

2 Claims. (Cl. 180—12)

This invention relates to a power assembly for a motor vehicle.

At the present time in motor vehicles particularly trucks, the power plant is mounted in the front portion of the vehicle and the drive is transmitted to the rear wheels through a long drive shaft. This arrangement acts as a limitation in the length of the truck or vehicle body due to the practical limitations to extending the drive shaft. As an outgrowth to the practical limitations to the length of the drive shaft, the combined tractor and truck assembly has been developed. This latter development has brought out a number of objectionable features which include the unsafe driving of the combined tractor and trailer around curves at fairly high speed, excessive overall length, and difficulty in backing or parking. Another objectionable feature of this combination is the limitation of the distance of the floor of the trailer or truck body from the ground.

It is, therefore, an object of this invention to provide a power plant assembly which may be positioned in the front end of the truck body and which drives the front wheels, thereby overcoming all of the above objectionable features.

Another object of this invention is to provide a power assembly of this kind which can be used in any length or size of truck body without affecting the length of the drive shaft.

A further object of this invention is to provide a power assembly which can be constructed as a unit and which includes the front drive axle and wheels, so that the unit can be assembled complete exteriorly of the truck body and then bodily incorporated with the selected body.

A further object of this invention is to provide in combination a power member, a transmission, a rotatable front axle including a differential gearing and an improved connection between the transmission and the drive shaft which is connected with the differential.

A further object of this invention is to provide in a front drive power assembly an improved power transfer mechanism for transferring the power from the transmission to the drive shaft, with the drive shaft offset laterally from the longitudinal axis of the transmission and the power plant.

To the foregoing objects and to others which may hereinafter appear, the invention consists of the novel construction, combination and arrangement of parts as will be more specifically referred to and illustrated in the accompanying drawings, wherein is shown an embodiment of the invention, but it is to be understood that changes, variations and modifications may be resorted to which fall within the scope of the invention as claimed.

In the drawings:

Figure 1 is a detail side elevation partly broken away of a front drive assembly constructed according to an embodiment of this invention, Figure 2 is a top plan partly broken away of the assembly, Figure 3 is a sectional view taken on the line 3—3 of Figure 1, Figure 4 is a detail front elevation of the front axle structure, Figure 5 is a sectional view taken on the line 5—5 of Figure 3, and Figure 6 is a fragmentary rear elevation partly in section of the radiator and the support therefor.

Referring to the drawings, the numeral 10 designates generally an internal combustion engine which is adapted to be mounted in an interior chassis or frame 11 forming the subject matter of my copending application Serial Number 403,734, now Patent No. 2,296,181, issued September 15, 1942, for a Power plant frame filed of even date herewith. The power plant frame 11 is secured within a truck frame or body structure 12 also forming the subject matter of my copending application Serial Number 403,731 filed of even date herewith.

The engine 10 has disposed forwardly thereof a radiator 13 which is connected with the circulating system of the engine 10 by means of pipes 14 and 15. The radiator 13 has secured to the lower end thereof a substantially U-shaped supporting strap or bar 16 having the legs 17 thereof vertical and positioned along the outer sides of the radiator 13. The upper ends of the legs 17 terminate in outwardly extending right angular supporting arms 18, which are adapted to be secured by fastening devices 19 to a supporting bracket generally designated as 20. The bracket 20 is secured to the inner side of the frame structure 11 and includes an upper horizontally disposed bar 21, a depending bar 22 and an inwardly projecting extension 23, which is formed with an opening 24 through which the fastening device 19 extends.

The engine 10 has secured to the rear end thereof a conventional transmission structure 25 provided with a gear shifter rod 26. A shaft 27 extends rearwardly from the transmission 25, extending through anti-friction bearings 28 which are carried by the rear wall 29 of the transmission structure 25, and the rear end portion of the shaft 27 is provided with splines 30. A sprocket or toothed driving member 33 is splined onto the splined portion 30 of the shaft 27, and a plate 31 formed with a stub 32 is fixed axially of the driving member by fastening devices 32a.

The toothed member 33 is positioned within the interior of a transfer housing generally designated as 35, which forms the subject matter of my copending application Serial Number 403,732 filed of even date herewith. The transfer housing 35 includes a front wall member 36 formed of a flat plate and the front wall 36 has secured thereto, as by welding 37, integral opposite side walls 38 and 39 and upper and lower end walls 40 and 41. The walls 38, 39, 40 and 41 are formed from a single strip of steel which has the ends thereof welded together as at 42 and preferably the side and upper and lower walls are formed of substantially ovoidal configuration. The side and end walls of the transfer housing 35 have secured to the outer surfaces thereof a plurality of spaced apart lugs 43 which are formed with threaded openings in which fastening devices 44 engage for removably holding a rear plate 45 on the rear edge portions of the side and end walls The rear wall or plate 45 is formed with a plurality of outwardly extending ears 46 having openings 47 through which the fastening devices 44 engage.

The ears 46 are adapted to engage against the rear end portions of the lugs 43 as shown in Figure 5. The front wall 36 of the housing 35 has secured thereto a forwardly projecting sleeve or bushing 48, which engages through an opening 49 formed in the rear wall 29 of the transmission structure 25. The shaft 27 extends loosely through the bushing or positioning sleeve 48. The front wall 36 of the housing 35 is detachably secured to the rear wall 29 of the housing 25 by means of fastening devices 50, which are constructed in the form of cap screws or the like and which are countersunk in the rear face of the front wall 36.

In order to provide an additional means whereby the transfer housing 35 may be accurately positioned with respect to the transmission structure 25 I have provided at least one dowel pin 51, which is fixed to the front wall 36 and projects forwardly therefrom into an opening 52 formed in the rear wall 29 of the transmission structure 25. In practice the transfer housing as shown in Figure 3 is inclined downwardly and outwardly or laterally with respect to the transmission structure 25.

A bearing cap generally designated as 53 is detachably secured as by fastening devices 54 to the rear wall or plate 45. The cap 53 includes a body 55 which has formed integral therewith a forwardly projecting sleeve 56. The outer race 57 of an anti-friction bearing structure is adapted to engage within the sleeve or bushing 56 and the inner race 58 of the anti-friction bearing structure is adapted to engage about the stub 32. Anti-friction balls 59 are interposed between the two race members 57 and 58.

A flexible driving connection 60 is trained about the toothed member 33 and is constructed in the form of an endless chain or belt structure known as a link belt. The flexible driving connection 60 extends downwardly from the toothed member 33 and is also trained about a lower toothed member 61. The toothed member 61 is formed with a splined hub 62, which is mounted on the splined rear end portion 63 of a drive shaft generally designated as 64. The drive shaft 64 at its rear portion extends through an anti-friction bearing member 65 which is mounted in a cylindrical sleeve 66, which is fixed to the front wall 36 of the housing 35. The sleeve 66 as shown in Figure 5 extends partly into the housing 35 and also projects partly forwardly therefrom. An oil seal or cap structure 67 engages about the forward end portion of the bushing 66 and closes the forward end portion of the bearing structure 65. A bearing cap member generally designated as 68 is secured as by fastening devices 69 to the lower portion of the rear wall 45.

The bearing cap 68 includes a plate-like body 70 which is formed with an integral forwardly extending sleeve 71 within which an anti-friction bearing member 72 engages. The bearing member 72 supports the rear end portion 63 of the drive shaft member 64. The sleeve 71 extends through an opening 73, which is formed in the rear wall 45 and when the bearing cap 68 is in applied position the cap 68 will hold the toothed member 61 against endwise movement.

The drive shaft structure 64 includes a rear shaft section 74, an intermediate shaft section 75 and a forward shaft section 76. A universal coupling 77 connects the rear section 74 with the rear end portion of the intermediate section 75 and a second universal coupling 78 connects the forward end of the intermediate shaft section 75 with the rear end portion of the forward shaft section 76. The rear section 75 has secured thereto a brake drum 79 and a brake band or shoe structure 80, which is carried by a forwardly projecting spider 81, engages about the drum 79. The spider structure 81 is secured in any suitable manner to the forward side of the front wall 36. It will be understood that the brake band or shoe structure 80 is adapted to have connected therewith the conventional brake operating means whereby the band or shoe structure 80 may be brought into engagement with the brake drum 79.

The transfer housing 35 is adapted to be supported adjacent the upper portion thereof by means of a pair of substantially V-shaped suspension members 82 and 83, which are secured by fastening devices 84 and 85 respectively to inwardly projecting supporting brackets 86 and 87 respectively carried by the frame structure 11. The suspension member 82 is provided with a horizontally disposed extension 88 through which the fastening members 84 engage and the suspension member 83 is formed with a horizontally disposed extension 89 extending from the apex of the suspension member 83 and through which the fastening member 85 engages. The suspension members 82 and 83 coact with the fastening members 50 securing the housing 35 to the transmission 25 in maintaining the housing 35 in the desired inclination to the vertical, whereby the drive shaft structure 64 will be supported at its rear end portion in downwardly and laterally offset position with respect to the engine 10.

As will be noted from Figure 1, the drive shaft structure 64 is of a length substantially less than the combined length of the engine 10 and the transmission 25. In this manner the drive shaft structure 64 is closely coupled with respect to the engine 10 and the transmission 25. A front axle structure 90 is disposed at right angles to the drive shaft structure 64 and is positioned beneath the engine 10 adjacent the forward portion thereof. The axle structure 90 has secured thereto a pair of semi-elliptical spring members 91, which are secured at their forward and rear ends to the frame structure 11. The axle structure 90 includes a conventional differential coupling 92, which is positioned at one side of the transverse median of the axle structure 90 and the differential coupling 92 is adapted to couple the forward shaft section 76 with the axle member 93. The outer end portions of the axle structure 90 are formed with parti-spherical coupling members 94 and 95, and complementary parti-spherical members 96 and 97 are carried by wheel members 98 and 99 respectively and engage the coupling members 94 and 95 respectively. The coupling members 96 and 97 are tied together by means of a tie rod 100, which is provided at the opposite ends thereof with bifurcated coupling members 101.

The parti-spherical coupling members 96 and 97 are each provided with a rearwardly extending arm 102, which engages between the bifurcations of the coupling member 101. In this manner the two wheel members 98 and 99 may be rotated or swung about a vertical axis forming part of the coupling structures 94 and 95, 96 and 97. A steering arm or knuckle 103 is secured as by fastening devices 104 to the upper side of the coupling member 96 and is adapted to be connected to a conventional steering mechanism. As will be noted in Figure 3 the tie rod 100 is provided with an intermediate downwardly offset portion 105, which extends below the differential structure 92. The arms 102 each have secured to the inner side thereof an angularly disposed lug 106 through which a threaded stop member 107 is adapted to engage. The stop member 107 is adapted to engage against the adjacent rear side of the axle structure 90.

The spring members 91 are secured as by U-bolts 108 to a horizontally disposed plate 109. The plate 109 has formed integral therewith a sleeve 110, which is mounted on the axle structure 90. There are two of the sleeves 110, one for each spring structure 91 and the sleeves 110 are mounted on the opposite sides of the differential structure 92, as shown more clearly in Figure 4.

The engine 10 at the forward portion thereof is provided with a pair of laterally extending supporting members 111, which engage on the upper side of inwardly projecting brackets 112. Fastening devices 113 secure the outer end portions of the supporting members 111 to the brackets 112. Preferably yieldable cushioning washers 114 are interposed between the under side of the supporting members 111 and the brackets 112, so as to cushion the forward end portion of the engine 10.

With a front drive structure as hereinbefore described it is possible to construct a truck or vehicle structure with substantially all of the operating means therefor in the forward portion of the vehicle so that the remaining portion of the vehicle may be used for receiving the articles to be transported or the like. The front drive structure forms a closely coupled and compact power unit and drive structure, which may be made sufficiently strong to withstand the strains to which the vehicle may be subjected. Furthermore with a front drive structure of this kind it is possible to construct a truck or vehicle body of any desired length which eliminates the long drive shaft necessary to connect the engine with the rear axle as in conventional trucks or vehicles. In addition to this the provision of the front drive structure hereinbefore described permits the more safe and economical operation of a truck or vehicle structure and eliminates the necessity of providing a combined tractor and trailer structure such as is now in use for relative large truck or trailer bodies. This front drive structure also permits the assembly of the driving mechanism on a relatively short chassis or frame and then securing the short and narrow chassis or frame within the forward end portion of the truck body or vehicle or frame. It will therefore be apparent that the truck or vehicle body may be constructed as one unit and the front drive structure as another unit which may be easily and quickly secured within the forward portion of the body unit.

What I claim is:

1. A closely coupled front drive assembly for the main frame of vehicles comprising in combination with an internal combustion engine, a power plant frame formed of a pair of parallel channel members having a length less than the total length of the main frame, said engine being disposed between and extending lengthwise of said channel members, the channels of said members being disposed in confronting relation, a pair of opposed engine supporting brackets fixed in said channels, a second pair of brackets fixed in said channels rearwardly of said first brackets, means securing the forward end of said engine to said first pair of brackets, a transmission connected to and extending from the rear end of said engine, a drive shaft below said engine, a drive connection extending downwardly from said transmission and connecting the latter with the rear end of said drive shaft, a housing about said drive connection, laterally projecting arms fixed to said housing, means securing said arms to said second pair of brackets, a transverse driven shaft beneath the forward end of said engine, and a coupling means between the forward end of said drive shaft and said transverse shaft.

2. A closely coupled front drive assembly for the main frame of vehicles comprising in combination with an internal combustion engine, a power plant frame formed of a pair of parallel channel members having a length less than the total length of the main frame, said engine being disposed between and extending lengthwise of said channel members, the channels of said members being disposed in confronting relation, a pair of opposed engine supporting brackets fixed in said channels, a second pair of brackets fixed in said channels rearwardly of said first brackets, a pair of laterally projecting arms carried by the forward portion of said engine, means securing said arms to said first pair of brackets, a transmission connected to and extending from the rear end of said engine, a drive shaft below said engine, a drive connection extending downwardly from said transmission and connecting the latter with the rear end of said drive shaft, a housing about said drive connection, laterally projecting arms fixed to said housing, means securing said latter arms to said second pair of brackets, a transverse driven shaft beneath the forward end of said engine, and a coupling means between the forward end of said drive shaft and said transverse shaft.

ARTHUR R. PERKINS.